(12) United States Patent
Vucurevich

(10) Patent No.: US 9,788,027 B1
(45) Date of Patent: Oct. 10, 2017

(54) METHOD AND MECHANISM FOR IMPLEMENTING A REAL TIME MEDIA DATABASE

(75) Inventor: Ted Vucurevich, Los Gatos, CA (US)

(73) Assignee: ENCONCERT, INC., Campbell, CA (US)

( * ) Notice: Subject to any disclaimer, the term of this patent is extended or adjusted under 35 U.S.C. 154(b) by 68 days.

(21) Appl. No.: 13/524,365

(22) Filed: Jun. 15, 2012

Related U.S. Application Data

(60) Provisional application No. 61/498,369, filed on Jun. 17, 2011.

(51) Int. Cl.
*H04N 21/2385* (2011.01)
*H04H 60/83* (2008.01)
*H04N 21/482* (2011.01)

(52) U.S. Cl.
CPC ........ *H04N 21/2385* (2013.01); *H04H 60/83* (2013.01); *H04N 21/482* (2013.01)

(58) Field of Classification Search
CPC .............. H04N 21/285; H04N 60/803; H04N 21/2385; H04N 21/482; H04H 60/83
USPC .......................................... 725/115; 709/229
See application file for complete search history.

(56) References Cited

U.S. PATENT DOCUMENTS

| | | | |
|---|---|---|---|
| 7,542,073 B2 | 6/2009 | Li et al. | |
| 7,835,785 B2 | 11/2010 | Scully et al. | |
| 8,001,472 B2 | 8/2011 | Gilley et al. | |
| 8,135,413 B2 | 3/2012 | Dupray | |
| 8,135,635 B2 | 3/2012 | Molotsi et al. | |
| 8,432,489 B2 | 4/2013 | Arseneau et al. | |
| 8,499,038 B1 | 7/2013 | Vucurevich | |
| 8,499,250 B2 | 7/2013 | Wetzer | |
| 8,565,735 B2 | 10/2013 | Wohlwend et al. | |
| 9,037,647 B2 | 5/2015 | Buzescu | |
| 2002/0080721 A1* | 6/2002 | Tobagi et al. | 370/236 |
| 2006/0031126 A1* | 2/2006 | Ma | G06Q 30/0601 705/26.1 |
| 2007/0078009 A1 | 4/2007 | Lockton | |
| 2007/0211678 A1* | 9/2007 | Li | H04W 40/244 370/338 |
| 2007/0299976 A1* | 12/2007 | Zafar | H04L 61/1582 709/229 |
| 2008/0189371 A1 | 8/2008 | Shaffer et al. | |
| 2009/0063419 A1 | 3/2009 | Nurminen et al. | |
| 2009/0237505 A1 | 9/2009 | Ortiz et al. | |
| 2010/0157972 A1* | 6/2010 | Junell | H04J 3/0638 370/350 |
| 2011/0071792 A1 | 3/2011 | Miner | |
| 2011/0075612 A1* | 3/2011 | Guo | H04H 60/80 370/329 |

(Continued)

OTHER PUBLICATIONS

Non-final Office Action dated Oct. 18, 2012, for U.S. Appl. No. 13/102,806.

(Continued)

*Primary Examiner* — Nathan Flynn
*Assistant Examiner* — Tung T Trinh
(74) *Attorney, Agent, or Firm* — Vista IP Law Group, LLP

(57) ABSTRACT

Disclosed is an improved approach for implementing a distributed media system, where ad hoc network connections may be created and optimized on a localized level. This efficiently allows for capture and distribution of media data, as well as the optimized allocation of bandwidth on the network in a distributed manner.

20 Claims, 12 Drawing Sheets

(56) References Cited

U.S. PATENT DOCUMENTS

| | | | |
|---|---|---|---|
| 2012/0136967 A1* | 5/2012 | Ito et al. | 709/217 |
| 2012/0224024 A1 | 9/2012 | Lueth et al. | |
| 2013/0117365 A1 | 5/2013 | Padmanabhan et al. | |

OTHER PUBLICATIONS

D.L. Mills, "Network Time Protocol (NTP)", M/A-COM Linkabit, Network Working Group, RFC 958, Sep. 1985, 14 pages.

David W. Allan et al., "The Science of Timekeeping, Application Note 1289" Hewlett-Packard Company, Jun. 1997, 87 pages.

Mark Martinec, "Time with Focus on NTP and Slovenia" Mar. 21, 2000, 35 pages.

D.L. Mills, "Internet Time Synchronization", IEEE Transactions on Communication, vol. 39, Issue 10, Oct. 1991, 12 pages.

David L. Mills, "Modelling and Analysis of Computer Network Clocks", University of Delaware, Electrical Engineering Department, Technical Report May 5, 1992, May 1992, 31 pages.

U.S. Appl. No. 13/102,794, filed May 6, 2011, Entitled "Method and Mechanism for Coordinated Capture and Organization of Multimedia Data", 33 pages.

U.S. Appl. No. 13/102,806, filed May 6, 2011, Entitled "Method and Mechanism for Performing Cloud Image Display and Capture with Mobile Devices", 47 pages.

Notice of Allowance and Fes Due dated Mar. 19, 2013 for U.S. Appl. No. 13/102,806.

Final Office Action dated Jun. 6, 2014 for U.S. Appl. No. 13/102,794.

Non-final Office Action dated Jun. 5, 2014 for U.S. Appl. No. 13/954,583.

Non-final Office Action dated Sep. 13, 2013 for U.S. Appl. No. 13/102,794.

Notice of Allowance and Fes Due dated Oct. 8, 2014 for U.S. Appl. No. 13/102,794.

Final Office Action dated Nov. 19, 2014, for U.S. Appl. No. 13/954,583.

Notice of Allowance and Fee(s) Due dated Apr. 30, 2015, for U.S. Appl. No. 13/954,583.

Non-final Office Action dated May 19, 2017 for related U.S. Appl. No. 14/846,703.

* cited by examiner

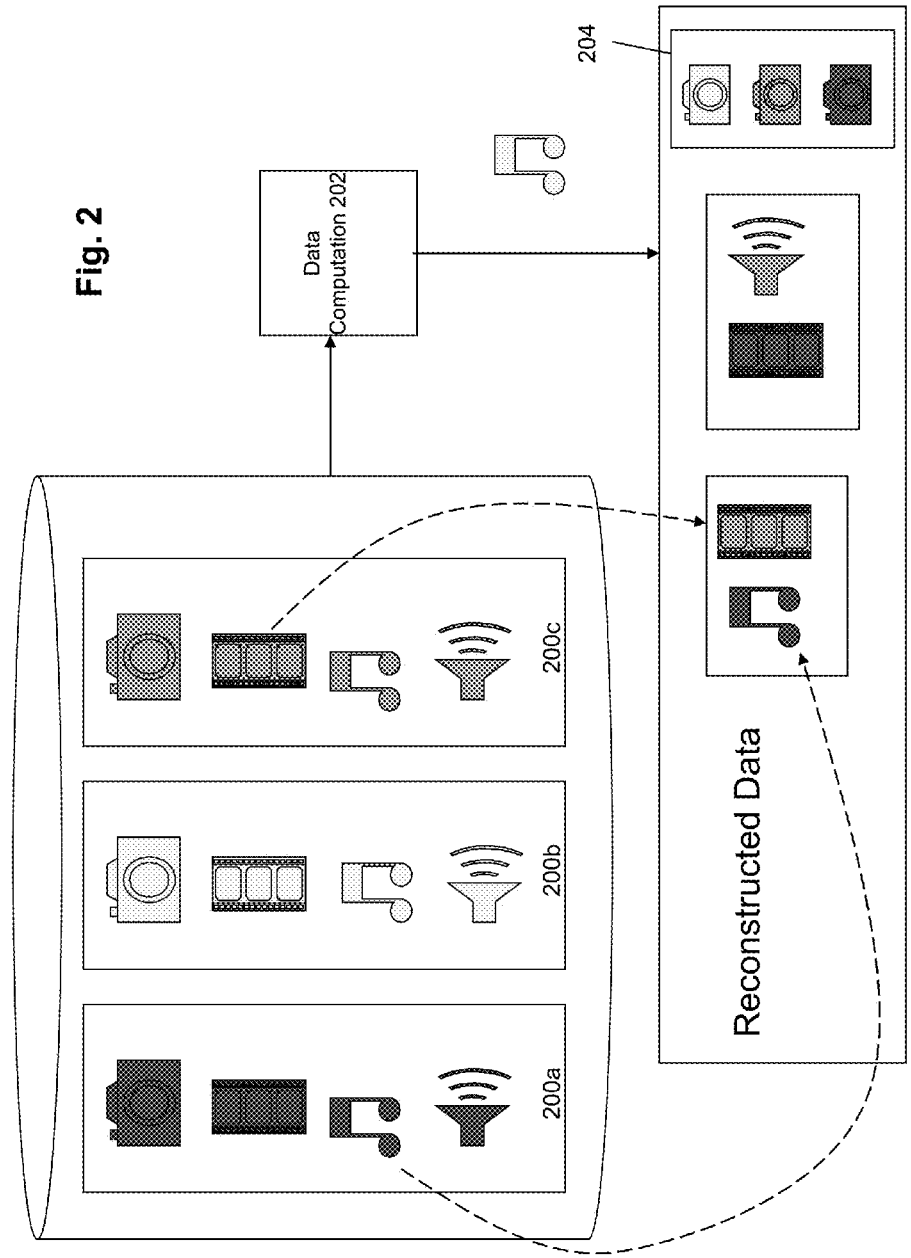

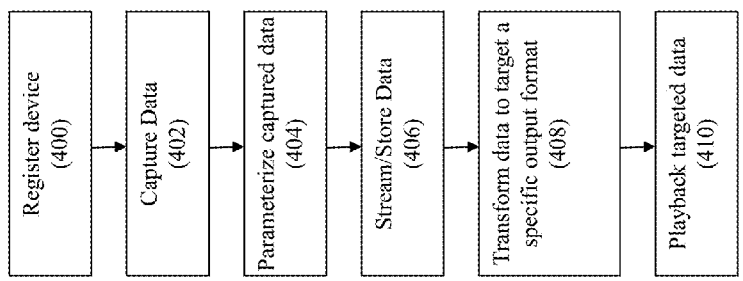

METHOD AND MECHANISM FOR IMPLEMENTING A REAL TIME MEDIA DATABASE

CROSS REFERENCE TO RELATED APPLICATIONS

The present application claims the benefit priority to U.S. Provisional Patent Application Ser. No. 61/498,369, filed on Jun. 17, 2011, entitled "METHOD AND MECHANISM FOR IMPLEMENTING A REAL TIME MEDIA DATABASE", which is hereby incorporated by reference in its entirety. The present application is related to U.S. application Ser. No. 13/102,794, filed on May 6, 2011, entitled "METHOD AND MECHANISM FOR COORDINATED CAPTURE AND ORGANIZATION OF MULTIMEDIA DATA", which claims the benefit of U.S. Provisional Application 61/332,522 and U.S. Provisional Application 61/332,490, both filed on May 7, 2010, which are hereby incorporated by reference in their entirety. The present application is also related to co-pending U.S. application Ser. No. 13/102,806, entitled "METHOD AND MECHANISM FOR PERFORMING CLOUD IMAGE DISPLAY AND CAPTURE WITH MOBILE DEVICES", which is hereby incorporated by reference in its entirety.

FIELD OF THE INVENTION

The present disclosure relates generally to the field of ad hoc multimedia data capture, processing, networking, and storage.

BACKGROUND OF THE INVENTION

Many types of events are held everyday which generate or are capable of generating different types of multimedia data. For example, consider the typical sporting event or music concert. Such events may be the subject of live broadcasting, filming, or streaming over the internet. The video of the event may be recorded from multiple camera angles, and focused at many different subjects from different parts of the music stage or sports field. In addition, for the concert example, sound recordings may be taken from many different locations, performers, or instruments. Still photographs are yet another type of media which may be captured for the event from many locations to obtain photographs of many different scenes at the event.

As is evident, any event may be associated with multiple sources of data that are created or recorded for that event. The data may be of different types and formats, e.g., sound, video, photographs, etc. While there are many devices that capture data relating to the exact same event, conventionally these capture devices are completely independent from one another. The conventional media that is used to capture these events, e.g., film, MPEG4, MPEG3, etc, inherently includes only information specific to each individual recording device and medium. Therefore, while the MPEG4 video recording may provide an accurate video of what is being recorded from a very specific camera angle at a very specific recording subject, there is no inherent way to correlate or relate that recording with any other video recording of the exact same event that may have occurred from another camera angle, with an audio or still photo recording of the same subject, or recordings in multiple media which are being directed at another recording subject.

Solutions to this problem may be highly manual in nature, high in cost, and are generally imprecise. For example, the broadcast of a sporting event may involve the strategic positioning of video cameras at different locations within the sporting arena. A production crew is charged with the task of knowing the locations of these cameras and the subjects that are being recorded with these cameras. During either a live broadcast or later production of an aggregated film clip, the production/editing crew must manually review the video recordings to determine the exact subject being recorded, and must essentially estimate or re-generate the relations between the different recordings. Therefore, any attempt to integrate the data from the multiple sources is essentially done in an ad hoc manner using highly manual techniques that generally "guess" at the recording parameters of each recording.

This problem is further complicated by the modern trend of having audience members bring portable electronic devices that are capable of capturing and recording the live event. For example, audience members may bring mobile phones that have image, video, or sound capture capability, and use those mobile devices to capture data relating to the event. Those mobile devices may be recording videos, images, or sound at different angles and at different subjects at the event. However, even though these portable recording devices are not "officially" recording the event on behalf of the event promoters, those recordings may still be of great interest to those that wish to provide a live broadcast or later production of a film for the event. This is because the mobile devices may be capturing videos or photographs that were not captured by the "official" recording devices, and which would be useful or desirable to include in the live broadcast or later production. For example, the mobile device may have captured the scene of a disputed referee call at a sporting event from a very useful angle, or captured the recording of a musical performance from a very unique angle or recording posture.

The disclosure of U.S. application Ser. No. 13/102,794 provides an improved approach for capturing multimedia information in a coherent manner to inherently permit aggregation or synchronization with other coherently captured multimedia information. That disclosure also provides a rich semantic model for relating and aggregating the captured data.

However, this type of media data is typically very large in size, and hence transfer of the media data across a network would require the consumption of a large amount of bandwidth. For a well-attended event where there are many users capturing media at the same time, it is quite likely that many of those users will attempt to transfer the captured media data at the same time. The problem is that conventional networking and data management techniques cannot sufficiently handle this large volume of data traffic over a limited bandwidth network at the same time.

SUMMARY

Some embodiments of the present invention provides an improved approach for implementing a real-time distributed media system, which is robust enough to handle large sets media data while being flexible enough to address the possibility of an attempt to move that large set of media data across a limited bandwidth network at the same or similar points in time. The approach of the current embodiment provides for a "lazy" aggregation of media cross a multi-tier architecture of storage devices.

Other objects, features, and advantages of the invention are described in the detailed description, figures, and claims.

BRIEF DESCRIPTION OF THE DRAWINGS

The drawings illustrate the design and utility of embodiments of the present invention, in which similar elements are referred to by common reference numerals. In order to better appreciate the advantages and objects of a preferred embodiment, reference should be made to the accompanying drawings that illustrate this preferred embodiment. However, the drawings depict only one embodiment of the invention, and should not be taken as limiting its scope.

FIG. 2 illustrates example approaches for manipulating captured data.

FIG. 4 shows a flowchart of a process for implementing some embodiments of the invention.

DETAILED DESCRIPTION

Some embodiments of the present invention provides an improved approach for implementing a real-time distributed media database, which is robust enough to handle large sets media data while being flexible enough to address the possibility of an attempt to move that large set of media data across a limited bandwidth network at the same or similar points in time. The approach of the current embodiment provides for a lazy aggregation of media cross a multi-tier architecture of storage devices.

The present disclosure describes an ad hoc network approach that is created in a way to more efficiently utilize the available bandwidth on the network. Consider if there are a large number of users that are capturing media at an event, such as a sporting event or concert event. It is likely that there will be specific moments of very high network demand when a large percentage of the users are trying to capture and send media at the same time, e.g., right after a big play occurs at the sporting event or right after the main act appears at the concert event. The ad hoc approach of the present invention permits the efficient discovery and usage of network paths to more effectively utilize and allocate the available bandwidth, even during period of high network demand. In addition, the present approach can be locally controlled and implemented, to reduce the inefficiencies associated with requiring centralized control over bandwidth allocations.

To provide a background for understanding the invention, a description will now be provided for an example approach that can be taken to capture media data.

Illustrative Example of Media Capture System

This disclosure will now describe an approach for capturing multimedia information in a coherent manner to inherently permit aggregation or synchronization with other coherently captured multimedia information. This approach also provides a rich semantic model for relating and aggregating the captured data.

Data is captured by the different capture devices in a parameterized manner, such that the data itself can inherently provide a consistent relationship relative to other items of data being captured for the same event. For example, some parameters associated with the data may include information to enhance the relationships between data, such as the location, viewing angle, and coordinated capture time for the device and/or data. Capturing the recorded data using such parameters allows the data to be more accurately and efficiently used and integrated. Additional contextual information about the event such as, but not limited to, name of song being played, play number in a sporting event, or act and scene in a play are also captured and related to the physical parameters.

Figure 1:
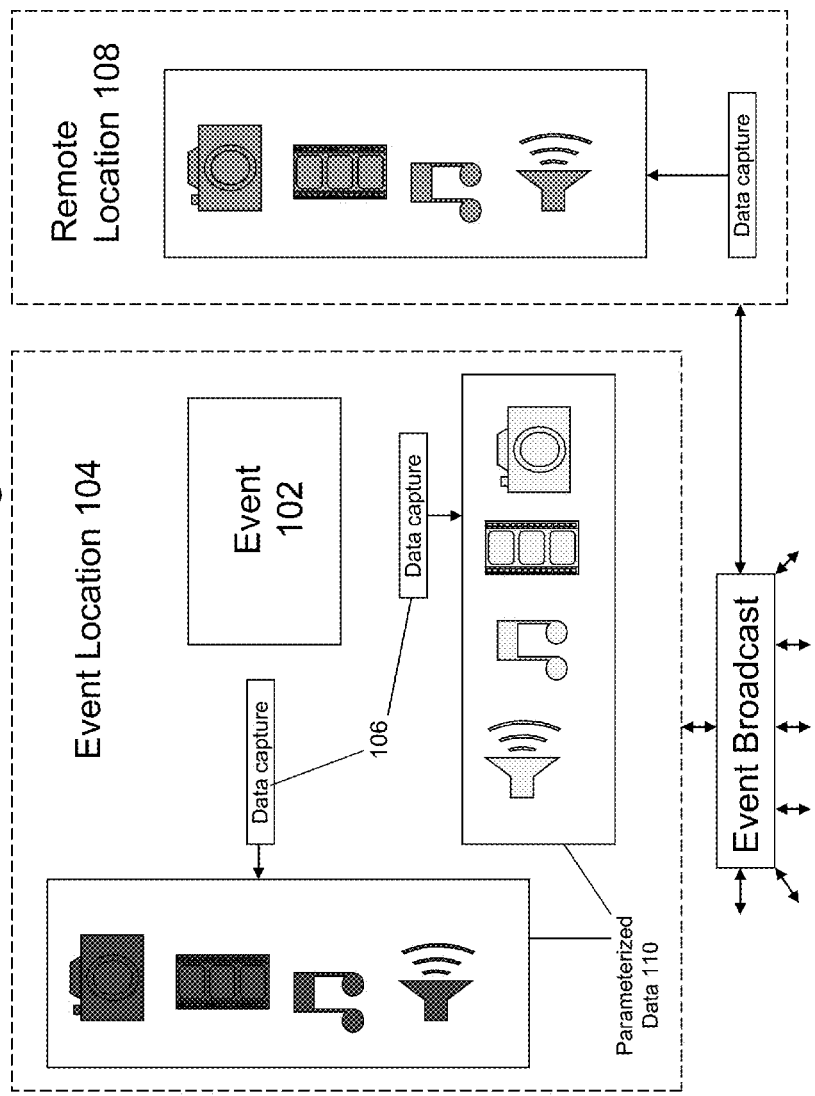
FIG. 1 illustrates an example event and data being captured for the event.

To illustrate, consider the event scenario shown in FIG. 1. This figure illustrates an event 102 that is occurring at a given event location 104. The event 102 may be any type of event that is capable of generating real-time recordable data. For example, the event may be a music concert that is occurring at a theater or other musical venue, or it may be a sporting event that is occurring at a sports arena.

At the event location, there are one or more data capture devices 106 that are capable of capturing one or more types of data or information at the event location. Any type of data capture device 106 may be used to capture any type of data for the event. For example, the data capture devices 106 may be used to capture video, pictures, audio, speech, and text. Such data capture devices may include video cameras, still photography cameras, sound microphones, and sound capture devices for musical instruments.

The data capture devices may be recording devices that have been "officially" placed and positioned in the event location by the sponsors or promoters of the event. Alternatively the data capture devices may be portable recording devices carried into the event location by the audience members, and which are recording the event in an "unofficial" capacity.

The data capture devices may be placed at any location or orientation at the event location. For example, assume that the data capture devices are video cameras. These video cameras may be positioned to view the stage from any location at the event venue, e.g., at fixed location in the venue for the official cameras or at various positions in the seating areas from the perspective of the audience. The video cameras may even be positioned from the perspective of the performers, e.g., by attaching video cams to the performers themselves.

The event may be recorded at the event location and broadcast to one or more remote locations 108. An example scenario is that the event is a music concert that is taking place live at a music venue such as a concert hall or music club. The live broadcast of the concert is streamed and broadcast to audiences at a remotely located venue, such as a music club in another city. The remote locations may also be associated with one or more data capture devices.

At both the local and remote locations, data can be captured for the event. At the remote locations, the data being captured could include, for example, video of the audience as they are viewing and participating with the streamed broadcast of the event from the main event location. At the event location, the data being captured may be for any aspect of the event that is occurring live, e.g., the event itself or the surrounding circumstances of the event such as the actions of the audience, real-time comments from the person taking the video, or any other recordable activities or sensations that may be taking place at the event location.

The data is captured and stored in a coherent fashion to allow the data to be easily and efficiently enhanced or interrelated. According to one embodiment, the captured data is stored and maintained as parameterized data 110 that allows for the collected data to be consistently interrelated with each other. Because the data has been captured in a coherent manner, the multiple sets of data can be easily replayed, reconstructed, or organized into an interrelated or aggregated way.

FIG. 2 provides shows an illustration of how the data can be enhanced in this manner. The top portion of the figure shows a set of parameterized data 200a, 200b, and 200c that has been collected for the event. The data could have been collected from any location, including the event location and any remote locations. The data is organized such that they can be coherently related to each other. For example, the video captured from a first capture device 200c at an exact moment in time can be correlated with the audio captured from an entirely different device 200a for that exact same moment in time.

Data computation 202 occurs to manipulate the data in a desired manner. For example, as shown in the bottom of the figure, it may be desired to combine the video captured from a first device with the audio from another device. This is useful, for example, if an audience member has captured a video of a concert from his/her own perspective using a mobile phone, and would like a recording of the concert from that video perspective but with the high quality audio recording from the microphones on the stage. Under this circumstance, the parameterized data would be used to identify the exact set of data that is being considered for aggregation, i.e., video data from a specific individual's mobile device combined with an "official" music track from the concert, mixing the entire ensemble, or emphasizing a particular performer, if so elected by the audience member. The parameterized data would also be used to match up the two sets of data such that they can be correlated for the same time periods and sequences of data capture. Based upon the individual's location, the time periods may need to be shifted to account for image/sound artifact adjustments, e.g., to account for sound delays if the individual was a significant distance away from the music performance. Finally, the appropriately combined data could be packaged up and provided to the individual as his/her "individualized" recording or souvenir of the performance.

Of course, as would be realized by those of ordinary skill in the art, the parameterized data can be manipulated or combined in many useful ways, and is not restricted to this exact example. For example, and as shown in FIG. 2, the still photographs taken by the various different capture devices could be collected and shown as a mosaic 204 of different views of the concert, displayed in real time at the event location and/or made available to participants after the event.

This highlights one of the advantages of the present approach in that inventive parameterization of the data not only allows for very accurate configurations/combinations of the data, but it also allows for very fast and efficient computations to occur for the data. This aspect of the invention is very important, especially if there is a desire or need to perform real-time generation of data for the event.

Figure 3A:
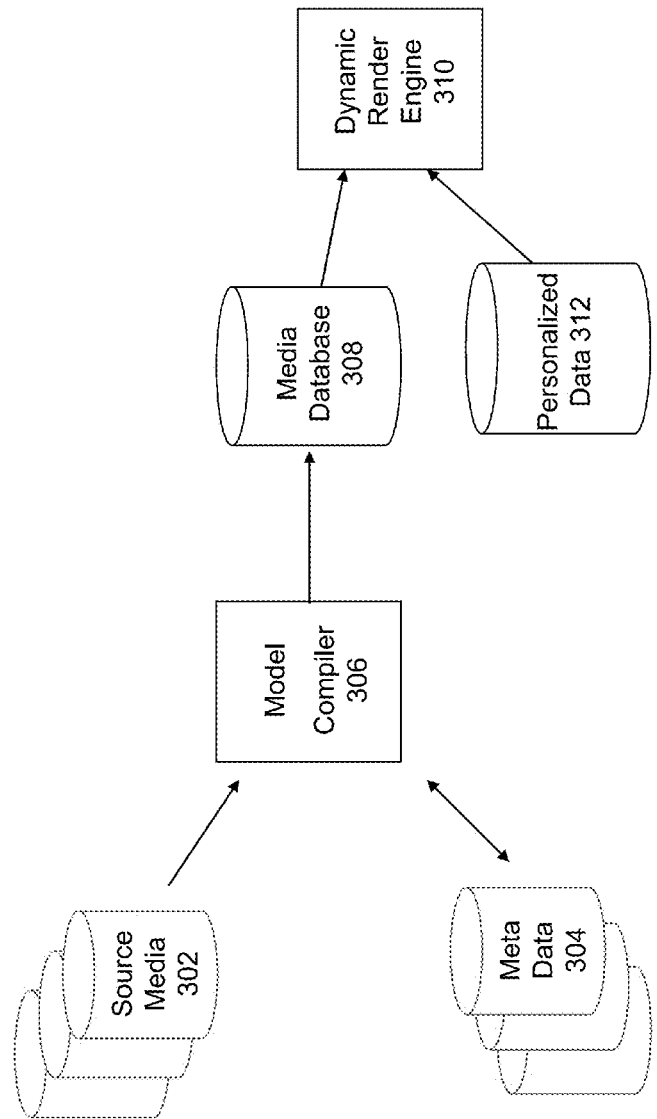
FIG. 3A-B show systems for implementing some embodiments of the invention.

FIG. 3A illustrates a high level architecture of a system for coordinating and managing data. The architecture comprises one or more source media 302 that contain media data for the event. The source media 302 may include, for example, the one or more sets of data at an event that is captured and stored for the event. For example, such source media 302 could include the media captured and stored by video cameras or microphones at the event. The architecture may also include metadata 304 that is associated with the source media. The metadata 304 comprises information that establishes coherency of the data relative to other data being recorded for the event. Such data includes, for example, information relating to data and the circumstances surrounding the capture of the data.

A model compiler 306 is employed to integrate the source media 302 and metadata 304 into a media database 308. The media database 308 comprises referential information and structures that retain and enhance relationships between the source media, and preferably is optimized to handle particular types of queries. For example, the model compiler 306 may integrate the source media 302 and the metadata 304 so that media database 308 contains referential structures relating to the spatial and temporal nature and parameters for the source media. In this way, queries can be made based on the spatial or temporal parameters associated with the source media, e.g., to search for media from a given time period or media from a given viewing angle or location.

The media that is produced in the system is not merely composed of static data. Instead, the media data 302 is compiled into the media database 308 in a way that intelligently and comprehensively retains the baseline media data 302, but also allows for the media to be dynamically combined and rendered into new types or sets of media data.

The dynamic render engine 310 is employed to manipulate the data in a desired manner, e.g., to combine media captured from a first device with media from a second device. The metadata 304 that is integrated into the media database 308 by the model compiler 306 forms parameterized data that is used to identify the exact set of data that is needed for manipulation.

The coherent nature of the data in the present embodiment permits accurate queries, since the metadata is configured to be coherent across different capture devices, e.g., where the different capture devices have been coordinated to operate on a common clock. This is unlike searches based merely on prior art timestamps, where timestamps are based on individual device clocks or timestamps for a first device may not accurately have a coherent relationship with the clocks or timestamps for a second device.

Personalized data 312 may also be created and stored for the event. Such personalized data 312 includes, for example, media that is captured from the mobile device being carried by an audience member at the event. The dynamic render engine 310 may be used to combine data from the media database 308 with the personalized data 312 to generate new types or sets of media data. For example, an audience member may have captured a video of a concert from his/her own perspective using a mobile phone, and would like a recording of the concert from that video perspective but with the high quality audio recording from the microphones on the stage. The dynamic render engine 310 matches up the two sets of data such that they can be correlated for the same time periods and sequences of data capture, and appropriately combines the data to produce an individualized recording or souvenir of the performance.

Figure 3B:
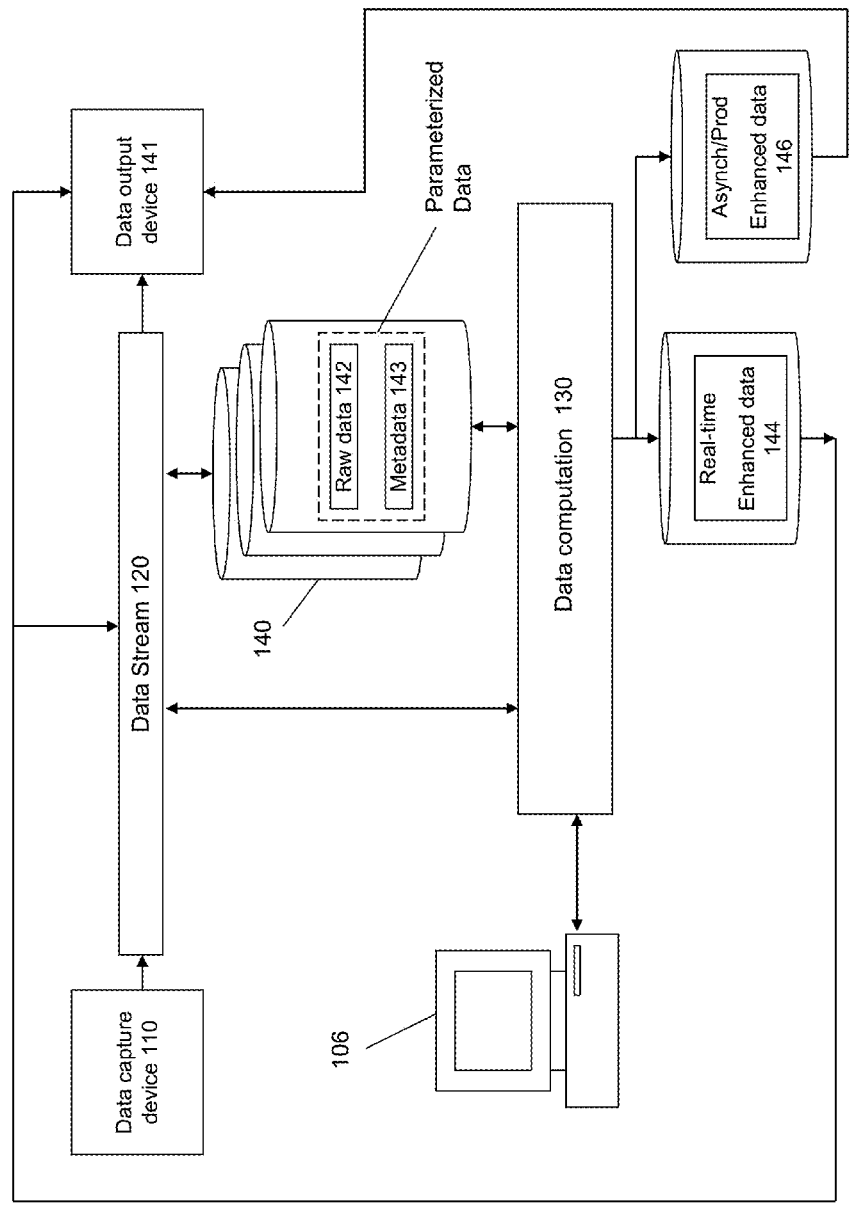

FIG. 3B illustrates a more detailed diagram of a system for coordinating and managing data for an event. The system comprises one or more data capture devices 110 which are used to capture data relating to the event. The data capture devices 110 may be any device or mechanism that is suitable for recording multimedia data, such as a video camera, still camera, audio recording device, or a device that integrates some or all of these functions. According to some utilizations of the invention, the data capture devices 110 include at least the capture devices that are provided by the host or sponsor of the event to officially record and/or broadcast the event. The data capture devices may also include any other device that is introduced into the event location that is capable of capturing information about the event. For example, such devices may include mobile telephones carried to the event location by audience members, where the mobile telephones have the capability to record video, audio, and/or still photographs.

Data captured by the data capture devices 110 are generally sent across a data stream 120 to be stored as parameterized data in storage device 140. The data stream 120 may be implemented using any suitable networking framework. For example, a local WiFi network may be established at the event location, which is accessed by mobile data capture devices. Wired network connections may be employed to support fixed data capture devices associated with stage-based recording equipment and fixed video cameras.

The parameterized data comprises the raw data 142 and metadata 143. The raw data 142 corresponds to the underlying media files/data captured by the data capture devices 110. For example, the raw data may be Mpeg4 video files recorded by a mobile device.

The metadata 143 comprises information that establishes coherency of the data relative to other data being recorded for the event. Such data includes, for example, information relating to data and the circumstances surrounding the capture of the data.

One type of metadata 143 that is associated with the raw data 142 is the location of the data capture device 110 that was used to capture the raw data 142. The location of the data capture device may be established using any suitable mechanism. For example, many mobile telephones now incorporate a GPS mechanism that allows calculation of the exact location coordinate for the telephone. For devices that do not incorporate such GPS mechanisms, or if more precise location coordinates are needed, a calibration process at the event location may be utilized to determine the location of the data capture device. For example, "pixel location calibration" may be implemented to identify the exact location of a mobile device, e.g., as described in co-pending U.S. application Ser. No. 13/102,806, entitled "METHOD AND MECHANISM FOR PERFORMING CLOUD IMAGE DISPLAY AND CAPTURE WITH MOBILE DEVICES", filed on even date herewith, which is hereby incorporated by reference in its entirety.

The metadata 143 may also include the orientation of the data capture device 110. Such orientation metadata identifies the specific direction that the data capture device is pointing towards during the period in which the associated raw data 142 was captured.

The metadata 143 also includes synchronized clock data that identifies the time period at which the raw data 142 was captured. It is important to make sure that the various data capture devices 110 are synchronized to the same clock so that the different items of captured data from multiple devices can be properly interrelated with each other. Therefore, the synchronized clock time metadata should be based upon a common clock that is utilized by all data capture devices 110. Any suitable approach can be taken to set the data capture devices to a common clock. One approach is to use the built-in GPS mechanisms within mobile devices, if they exist, to synchronize the clocks within the data capture devices 110. An alternative approach that can be employed is to use a clock calibration process at the event location in which the various data capture devices work with a data controller at a central location to have each mobile device lock to a common clock. An example of this type of approach is described in co-pending U.S. application Ser. No. 13/102,806.

The metadata may also include identification information relating to the live broadcast at certain points in time. For example, at a music concert, the metadata may be used to identify the particular song that is being played during a given time period, and hence the song that corresponds to a given set of data recordings. This type of metadata permits easier classification and later querying of the recorded data as they pertain to certain subjects at the event.

Additional types of meta data include but are not limited to: individual performer or instrument being recorded, play number, period, game time of sporting events, scene in theater, hardware configuration of musical equipment, lighting control configuration, and others.

The metadata 143 is transmitted to a central server at or around the time of its creation. However, it is possible that the raw data 142 is not immediately transmitted to a central server. This is because the bandwidth required to enable every mobile device immediately and in real-time to send the raw data 142 across the network could be too costly in terms of system resources. Instead, in some embodiments, a smaller-footprint summary of the raw data 142 is sent to the central server, with the larger-sized raw data staying at the mobile device until it is requested. The smaller-footprint summary may comprise any type of summary data, so long as it provides sufficient information regarding the contents of its corresponding raw data 142. For example, thumbnail images may be sent to the central server in place of raw high-resolution video or full-resolution photograph images.

A placeholder is maintained at the database of the central server to store the raw data 142. Pointer data is sent to the mobile devices to identify the specific addresses or locations of the placeholders at the central server for the raw data 142.

At the central server, the smaller-footprint summaries are stored with the metadata to allow an organized view of the entirety of the data being captured for the event. Queries may be performed upon this metadata to search for and identify specific items of data that may be of interest for data enhancements.

When there is a desire to access the raw data 142, a check is made at the central server to see if the raw data has already been downloaded from the remote capture devices. If not, then a request is sent to the remote devices to provide the raw data. The pointer data provided to the remote mobile devices permits the raw data to be deposited at the correct placeholder locations at the central server.

It can therefore be seen that storage device 140 may actually comprise a plurality of different devices that act in a coordinated way to store the raw data 142 and the metadata 143. At different points in time, different portions of the raw data 142 and the metadata 143 may be spread across various devices within the system, where some data is stored at a central server and some are stored at remote devices.

Of course, these actions relative to storage of data in storage device 140 will be varied depending upon the type of data that is being handled. For example, it is possible that the remote data capture device is capturing very low resolution images or video, and hence there is no need to send thumbnails in place of the full images. Instead, since the bandwidth requirements are so low to send the raw data for low resolution images or video, it may be more efficient to immediately send the raw data to the central server after it has been captured.

The data storage devices 140 may be implemented as any combination of hardware and software that allows for ready access to the data that is located at the data storage devices 140. For example, the data storage devices 140 could be implemented as computer memory operatively managed by an operating system. The data storage devices 140 could also be implemented as an electronic database system having storage on persistent and/or non-persistent storage.

A data computation module 130 is used to generate enhanced data from the parameterized data. Data computation module 130 accesses the parameterized data to select specific items of data to operate upon. The data may then be enhanced by modifying that data, combining that data with other data, or merely sending that data to another destination.

As previously noted with respect to FIG. 2, data computation may be performed to manipulate the data in any desired manner. For example, it may be desired to combine the video captured from a first device with the audio from another device. The raw data may also be altered in some way, e.g., to account for and correct artifacts in or related to the captured data. The still photographs taken by the various different capture devices could be collected and shown as a mosaic of different views of the event.

Another example of data manipulation is automatic distortion correction. Many devices will capture media in an imperfect way (out of focus, audio clipping, etc). This invention facilitates the use of neighboring devices or pre characterized models of the event environment to enhance the quality of the media using but not limited to such techniques as Bayesian Network-based machine learning pattern matching.

Further details regarding the operations performed by data computation module are described in more detail below in conjunction with FIG. 5.

The enhanced data may take different forms depending upon the circumstances for which the data is being produced. The enhanced data may be generated and used in real-time to be displayed or distributed at the event. For example, the real-time enhanced data 144 may be the type of data that is being broadcast or displayed live at the event location or distributed in real-time to the mobile devices. Resource consumption issues and quality of service (QoS) issues may dictate the manner and form in which the real-time enhanced data 144 is generated. For example, with respect to enhanced video recordings distributed in real-time, bandwidth limitations may result in the enhanced video being produced at lower-quality resolution levels. In contrast, asynchronous/production enhanced data 146 may be produced for non-realtime consumption which do not suffer from such limitations. Therefore, an enhanced video that is in high definition quality may be distributed with much lower quality resolution as real-time enhanced data 144, but retains its high definition quality as asynchronous/production data 146.

The real-time enhanced data 144 may be fed back to the data stream 120 and re-accessed by any of the devices having access to the event data to generate even more enhanced data. Alternatively, the real-time enhanced data 144 and the asynchronous/production enhanced data 146 may be sent to data output devices 141. The data output devices 140 comprise any device that is capable of receiving the enhanced data. For example, the data output device 141 may comprise a display device, such as a large screen at the event location. The data output device may even be the same mobile device (such as a mobile phone) that was used to capture the raw data in the first place.

The system or its components may be controlled or accessed by one or more users at one or more user stations 106 that operate the system. The user station 106 and/or any of the components controlled by the user station 106, such as the data computation module 130, comprises any type of computing station that may be used to operate or interface with the system. Examples of such user stations 106 include for example, workstations, personal computers, or remote computing terminals. User station 106 comprises a display device and/or audio device, such as a display monitor and speakers, for displaying or playing back recorded data to users at the user station 106. User station 106 also comprises one or more input devices for the user to provide operational control over the activities of system, such as a mouse or keyboard to manipulate a pointing object in a graphical user interface.

FIG. 4 shows a flowchart of a process to operate the system of FIG. 3. At 400, a data capture device is registered with the system. For example, at each event location, the local WiFi server would broadcast a signal indicating the availability of participating at the event. When the user of a WiFi-enabled mobile device searches for any nearby WiFi networks that are associated with an event, the signal for one or more events may be identified by the mobile device. The user would select at least one of the events to register the mobile device. The central server would establish a connection to the mobile device and set up unique identification protocols so that any data captured by the mobile device can readily be identified and associated with that specific device. The mobile device would also be synchronized to the common clock shared by all devices for the event.

At 402, the mobile device is used as a data capture device to record some item or items of data corresponding to the event. As noted above, examples of such data include video, sound recordings, or still photographs. The captured data is parameterized at 404 to include metadata containing information to establish coherency of the captured data relative to other data being recorded for the event. Such data includes, for example, information relating to data and the circumstances surrounding the capture of the data, such as position metadata and orientation metadata for the mobile device, as well as clock data with regards to the recording time of the captured data.

At 406, the raw data that was captured and the metadata that was generated are streamed and/or stored as appropriate either at a central server or at the mobile device. The captured data is transformed, at 408, to target a specific output format. This is a compilation action that provides enhanced data suitable for a contemplated use case or use platform. At 410, the targeted data can then be played back on a designated output device.

Figure 5:
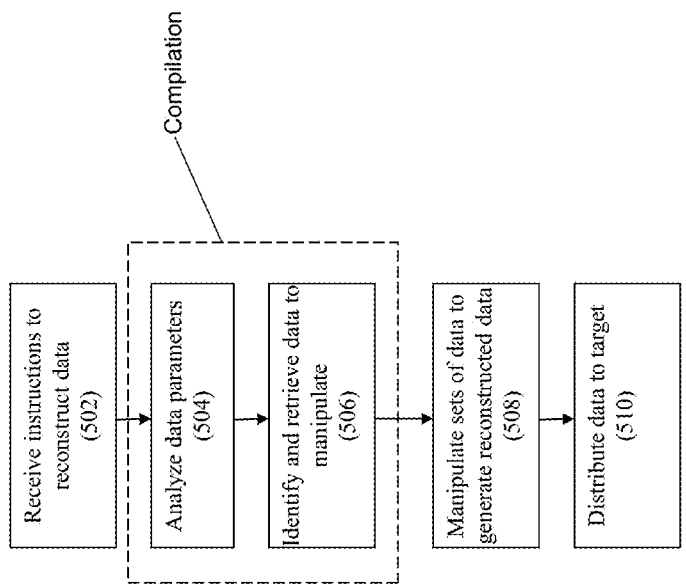
FIG. 5 shows a flowchart of a process for generating data enhancements according to some embodiments of the invention.

FIG. 5 shows the flow of a process for generating enhanced data according to some embodiments of the invention. At 502, control instructions are received to manipulate the source data to generate the enhanced data. The control instructions include a target definition that identifies the resources or formats for which the enhanced data is to be generated. For example, the request could be directed to generate a video that is to be played back on a mobile device that is compatible with the Mpeg 4 video format. The target definition would specify that designated format as the output format for the enhanced data.

In addition, compilation control parameters may be included as part of the control instructions. For example, the compilation control parameters may identify whether the enhanced data is to be generated for real-time distribution/display, or whether the enhanced data is to be asynchronously produced for consumption by the requester. Therefore, there may be specific quality requirements and limitations as part of the control parameters or target definitions.

During the compilation stage, the data parameters are analyzed at 504 to identify the specific items of data that need to be accessed at 506 to generate the enhanced data. The metadata at the database at the central server is queried to perform the analysis actions of 504. For example, the initial request may seek video that is recorded from a particular camera angle. The metadata is queried to identify any or all data that was captured from the correct camera angle. In addition, the initial request may include target definitions that require a certain quality threshold for the data. The metadata is analyzed to make sure that the data being identified for enhancement matches the required quality levels of the request. Based on the results of this analysis action, the central server may issue a request to one or more remote devices to transmit raw data to the central server.

At 508, the retrieved data is manipulated to generate the enhanced data. Any appropriate data editing or manipulation technique may be used to generate enhanced data from the raw data. These manipulations include but are not limited to, 3D synthetic image generation, 3D special audio processing, machine learning-based pattern matching for automatic media quality improvement, and others. The enhanced data is then distributed to a target device at 510.

Real-Time Media System

Figure 6:
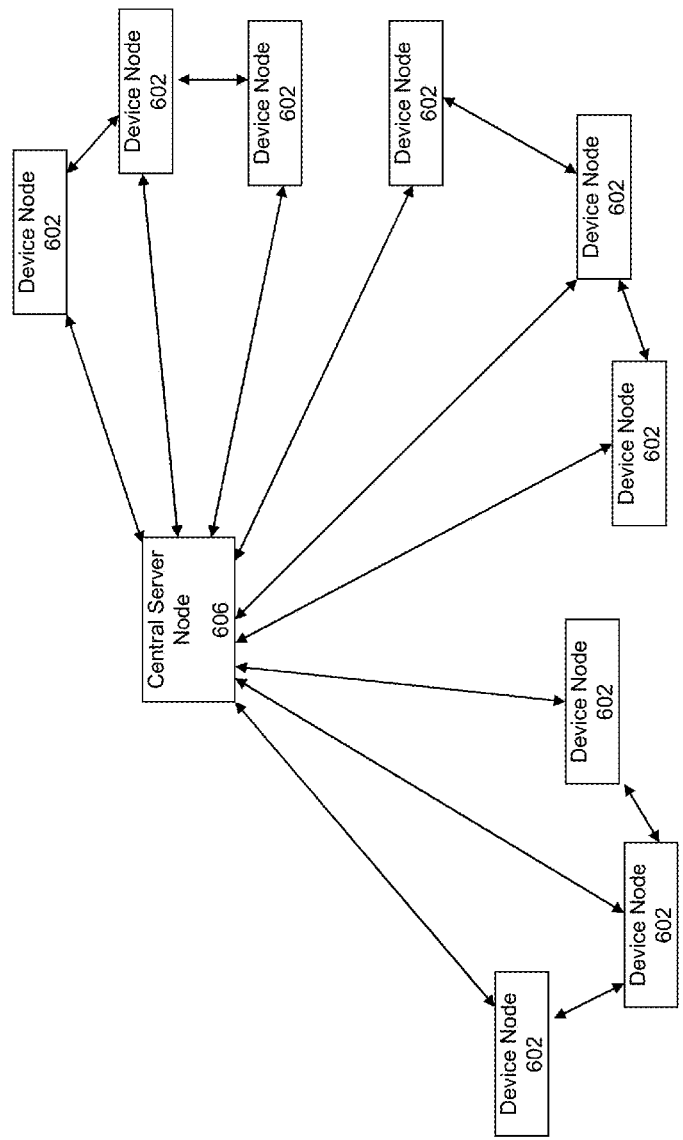
FIG. 6 illustrates an example multi-tier media system according to some embodiments of the invention.

Embodiments of the current invention provide an approach for implementing a multi-tiered real-time media system, where there can be any number of tiers in the media system. FIG. 6 shows the architecture of two-tiered real-time media system, in which the source media are captured by the device nodes 602. The media data captured by the device nodes 602 are sent to a central server node 606. The general idea behind embodiments of the invention is that the devices 602 and 606 in this architecture may form ad hoc connections to more efficiently utilize the available network bandwidth to that may be available to send data between these devices.

Each device node 602 comprises local storage to hold the captured media data. For example, the device node 602 could be a mobile phone that has the capability to capture sounds, video, or pictures, and also possess local memory (e.g., flash memory) to hold this captured media. The device node 602 also includes a communications mechanism to send and receive the media data across a network. For example, the device node 602 could be a mobile phone that has the capability to send and receive data across a cellular network and/or a Wifi network.

The central server node 606 comprises a database to hold metadata and/or raw data for the media that is captured by the device nodes 602. The raw data corresponds to the underlying media files/data captured by the device nodes 602. The metadata comprises information relating to the raw data, such as information relating to raw data and the circumstances surrounding the capture of the data. Such metadata may include, for example, the location, date/time, and/or orientation of the device node 602, e.g., as described above in the previous section of the disclosure.

The metadata is transmitted to the central server node 606 when the user desires to upload the captured data in the media system. In some embodiments, the media is made available to other users of the media system. For example, as described above in the previous section, the media data may be accessed by users that wish to view video, pictures, sounds, or text that are captured by other users at an event.

Figure 7:
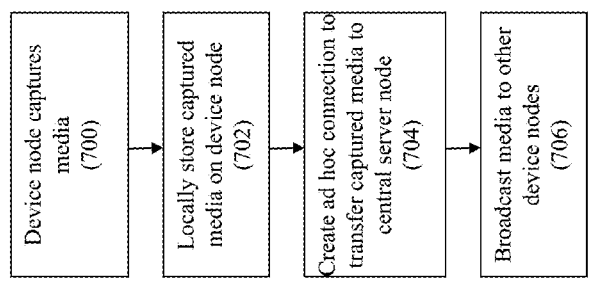
FIG. 7 shows a flowchart of an approach for using a multi-tier media system according to some embodiments of the invention.

FIG. 7 shows a flowchart of an approach for transferring data across an ad hoc network according to some embodiments of the invention. At 700, the device node captures the media data. The media data comprises any type of media information, including for example, video, pictures, sound, and text. At 702, that captured media data is initially stored locally at the device node. The captured media may be tagged with metadata about the captured media.

At 704, an ad hoc connection is made to transfer the media data to the central server node. This is a locally initiated connection that is formed through a discovery process of the available resources for sending the media data to the central server node. As described below, the connection is flexible enough to account for periods of peak network usage, so that the connection settings are modified to more optimally utilize the available bandwidth.

At 706, the media can be broadcast to other device nodes through the central server node. In some embodiments, this essentially creates a broadcast method that is implemented by transmitting metadata to the central server node, which then publishes information about newly acquired media to other devices nodes. Users at the other device nodes may then choose to access the newly captured media by requesting the media from the central server node. If the raw data is stored at the central server node, then the central server node can directly transmit the media data to requesting device node. If the raw data is not available at the central server node, then raw data can be either sent directly from the local storage location to the requesting device node, or first loaded to the central server node for subsequent transmission to the requesting device node.

A "lazy" approach can be taken to transmit the media data to the central server node, where the raw data is not immediately transmitted to the central server node. Instead, metadata about the media data is first sent to the central server node, which is first broadcast to the other device nodes. The metadata provides a smaller-footprint summary of the raw data, with the larger-sized raw data staying at the device node until it is requested or until periods of reduced bandwidth usage on the network. The smaller-footprint metadata comprises any suitable type or quantity of information about the media data, so long as it provides sufficient information regarding the contents of its corresponding raw data to permit a user to know about its contents. For example, thumbnail images may be sent to the central server node in place of raw high-resolution video or full-resolution photograph images. A user may see the thumbnail, and decide to download the full media data, at which time the raw data would be transmitted to the user over the ad hoc network.

The ad hoc network is created in a way that more efficiently utilizes the available bandwidth on the network. Consider if there are a large number of users that are capturing media at an event, such as a sporting event or concert event. It is likely that there will be specific moments of very high network demand when a large percentage of the users are trying to capture and send media at the same time, e.g., right after a big play occurs at the sporting event or right after the main act appears at the concert event.

The ad hoc approach of the present invention permits the efficient discovery and usage of network paths to more effectively utilize and allocate the available bandwidth, even during period of high network demand. In addition, the present approach can be locally controlled and implemented, to reduce the inefficiencies associated with requiring centralized control over bandwidth allocations.

Figure 8:
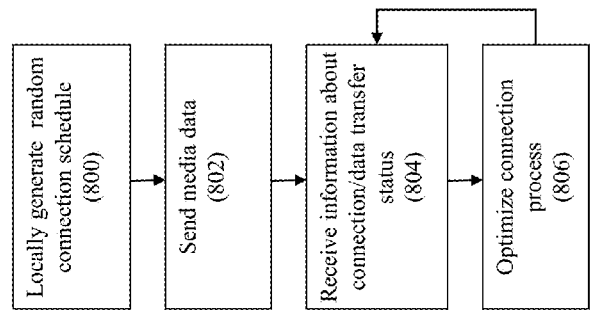
FIG. 8 shows a flowchart of an approach for implementing a distributed ad hoc network according to some embodiments of the invention.

FIG. 8 shows a flowchart of an approach for implementing an ad hoc network according to some embodiments of the invention. At 800, a locally generated random or quasi-random connection schedule is implemented for the device node. The general idea is that it is predictable that multiple users will seek to acquire bandwidth at or around the same time. For example, it is predictable that users will wish to capture and upload media data at a sporting event right after a big play occurs at a sports game. Therefore, it would not be prudent to allow every user to immediately access the network when requesting that access, since this type of usage by all users at the exact same time could potentially create access, latency, and quality of service (QoS) problems.

Instead, the device node will locally decide upon a randomized schedule to impose a delay for its requested network access. For example, the device node will impose a delay of time t before actually sending data over the network to the central server node. Each device will impose its own randomly generated delay, so that there will be a more uniform distribution of bandwidth requests for the network, even if there are many user seeking to upload media data at the same time period. In this way, the actual workload being imposed on the network inherently becomes spread over the available bandwidth for the network. The device nodes are all synchronized to a common clock to allow the device nodes to more effectively create random schedules that will evenly spread the network usage across the available bandwidth.

At 802, the media data is sent across the network according to the randomly scheduled transmission procedure. Since each local device node is pushing data across the network with differing levels of randomized delays, this means that the different local device nodes will be accessing the network at slightly different times. In effect, a distributed scheduler has been created, in which each local node becomes a scheduler for just that node. This allows for a statistically meaningful distribution of the network requests to be uniformly spread across the available bandwidth.

As noted above, this transmission of the media data may occur in a lazy fashion, where only metadata is initially transmitted, while the raw data is retained in local storage. This further makes the network usage more efficient across the network.

Next, at 804, information is received at the device node regarding the status and/or results of the requested data transmissions. This information provides details to the device node regarding the success or failure of the requested transmission of the media data. For example, at the lower physical layers of the TCP/IP stack, information may be generated regarding the number of packets that have either successfully been sent/received, which have not been successfully sent, and/or the number of retries that were needed in order to transmit the data.

At a higher logical level, information may be sent from the central server node that indicates the state of network and bandwidth usage. For example, the central server may provide an indication that the requested data transmission has been successfully made, or an indication that various delays had actually occurred for the requested data transfers. The number of new media items broadcast from the central server node also provides a logical indication of whether or not the bandwidth usage is at a high or low capacity.

The received information provides a very real statistical view of the current bandwidth usage situation for the network. For example, if there are many errors, delays, or problems in fulfilling the transmission request, then this is an indication of high network usage. In addition, if the central server is indicating that there have been a large number of recent media uploads, then this information also provides an indication of high network usage.

At 806, the received information can be used as feedback to further optimize the network connection. For example, the received information could indicate a period of very low network usage. This means that the randomized schedule could be changed to allow more frequent data transmissions, e.g., by changing the randomized delay period to either zero delay or to a very small delay. On the other hand, the received information could indicate a period of very high network usage. This means that the randomized schedule should be changed to reduce the frequency of the data transmissions, to spread the network usage even further across the available bandwidth. Therefore, the randomized delay period could be increased to an even higher delay level.

Other types of optimizations may also be taken. For example, the device node may have the ability to transmit data over multiple network types, such as a cellular network and a Wifi network. The received information may indicate that one type of network has a lower current usage as compared to the other network type. Therefore, an optimization may be implemented to use one type of network over the other type of network.

The local network may be used to control the selection of the optimizations that are taken. This approach means that the local device will not need to wait for a centralized server to instruct the local node in the exact data transmission strategy that should be taken. Another advantage of this local control is that since these types of instructions are not being sent from a server to the local device node, less of the valuable bandwidth would need to be used to optimize the network usage, which leaves more bandwidth that can be used to transmit the media data. Moreover, this local optimization allows the device node to quickly adapt to local network conditions that specifically affect only that node and/or its immediate locality within the network.

Therefore, as the network usage happens over time, more and more knowledge is obtained that allows a local node to more accurately create its local schedule to optimally utilize that network. This occurs across the different nodes in the network, so that on a distributed basis, the network scheduling improves and adapts to changing network usage conditions.

Figure 9:
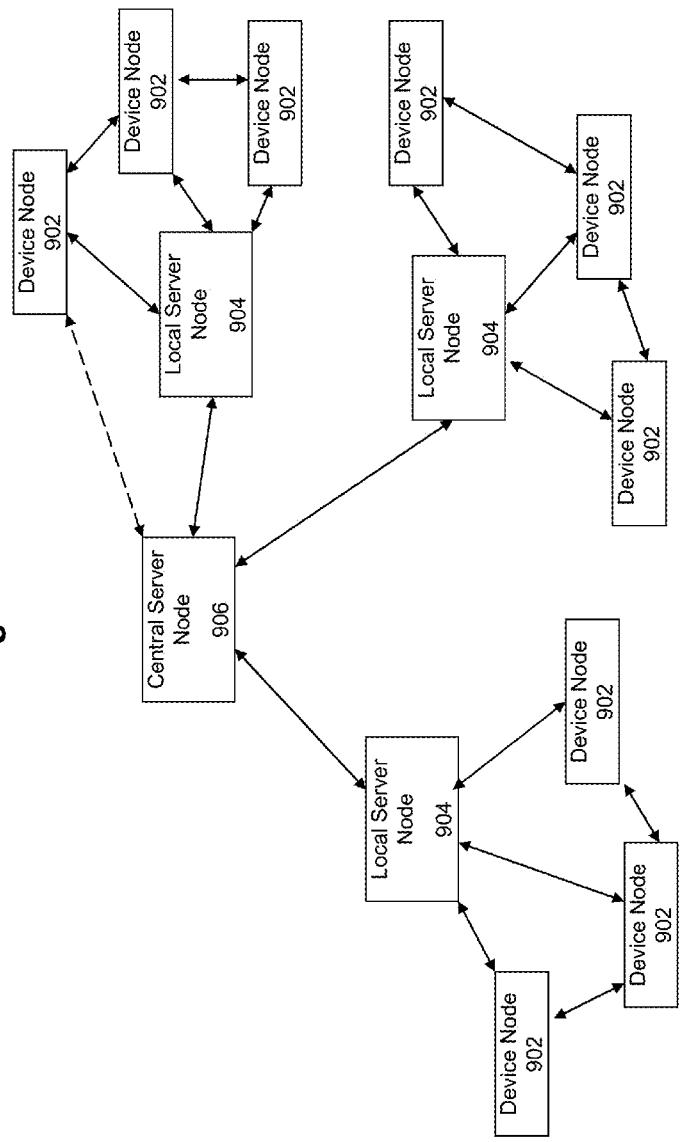
FIG. 9 illustrates an example three-tier media system according to some embodiments of the invention.

Any number of tiers may be implemented for the distributed media system of embodiments of the invention. As shown in FIG. 9, local server nodes 904 may be utilized that reside between the device nodes 902 and the central server node 906. The local server nodes may act in different capacities depending upon the need for its services. For example, the local server node 904 may act as a local aggregation node to collect media data from the device nodes, where cached media from the device nodes 902 are first cached at the local server nodes 904 instead of, or before, the media is sent to the central server node 906.

The general idea is that there may be situations in which much of the data exchange in the media system are very much localized. For example, at a concert where media is being captured and exchanged, it is possible that an overwhelmingly large percentage of the immediate exchange of media data will likely occur between device nodes that are actually at the concert event/location. Therefore, instead of sending all of that network traffic to the central server node, a local server node can be used to handle that localized media exchange.

Figure 10:
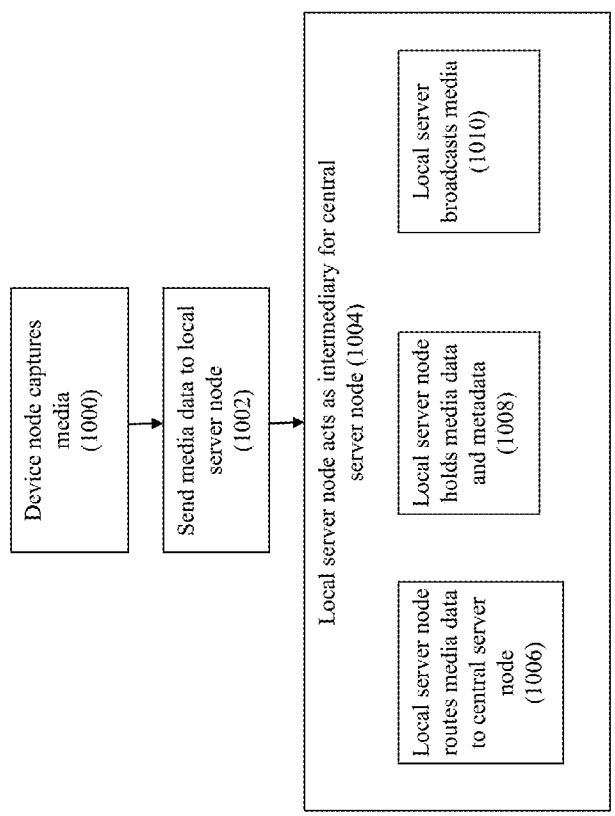
FIG. 10 shows a flowchart of an approach for utilizing a three-tier media system according to some embodiments of the invention.

FIG. 10 shows a flowchart of an approach to utilize a local server node in a multi-tiered media system hierarchy according to some embodiments of the invention. At 1000, the local device node will capture the media data.

At 1002, the local device node will send the media data to the local server node. The local server node essentially acts in the place of the central server node to collect metadata from the device nodes that are local to that local server node. This position by the local server node may be configured by the administrator of the media system upon recognition of the localized circumstances. For example, the system administrator may recognize upfront that a local server node should be used at a concert event to handle intra-concert media exchanges.

In addition, this utilization of a local server node may be based on recognition of situation that lends itself to a need for a local server node to act in this capacity, and dynamic instantiation of this localized usage for the local server node. For example, the central server node may notice that there are a large number of data captures and transmission requests that are occurring from a certain location, and this situation may more efficiently lend itself to having all requests from the device nodes in that location routed through a local server node rather than being directly sent from the device nodes to the central server node.

Therefore, at 1004, the local server node will act as an intermediary for the central server node. For example, at 1006, the local server node may essentially act as a router to route data between the local device nodes and the central server node. The local device nodes may be configured to direct data transmission to the address of the local server node. The local server node may consolidate those requests for transmission to the central server node.

In addition, the local server node may act as a local cache for the media data (1008). The local server node may therefore include a metadata database to hold metadata for the media data, similar to the metadata database that resides at the central server node (but more limited to media the local device nodes or of interest to the local device nodes). In addition, the local server node may include a data store to hold the raw media data for the captured media.

The local server node may also act to implement broadcast functionalities that are otherwise being handled by the central server node (1010). For example, the local server node may broadcast the information about newly captured media by one local device node to other local device nodes. In addition, the local server node may handle requests for that media by a user at a local device node, by obtaining and/or sending the raw data for that media to the requesting device node.

Therefore, what has been described is an improved approach for implementing a distributed media system, where ad hoc network connections may be created and optimized on a localized level. This efficiently allows for capture and distribution of media data, as well as the optimized allocation of bandwidth on the network in a distributed manner.

System Architecture Overview

Figure 11:
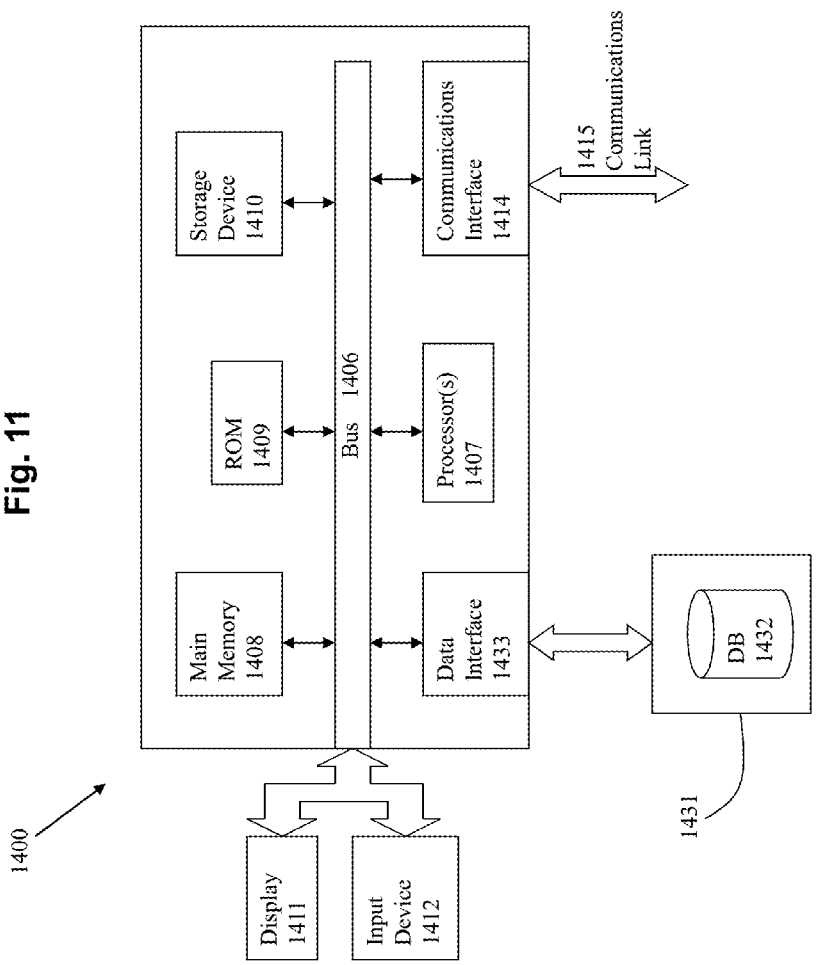
FIG. 11 shows an example computing system with which embodiments of the invention may be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system/main memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system/main memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 connected by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A data interface 1433 may be used to access a database 1432 on medium 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing a multi-tier media system at an event location for an event, comprising:
   identifying media at a device node;
   identifying a server node that is to receive the media from the device node;
   synchronizing the server node, the device node, and other device nodes to a common clock; and
   wherein the device node at the event location locally controls a schedule to transfer the media, in real-time at the event, from the device node to the server node using a network connection using the common clock.

2. The method of claim 1 in which the media was captured and locally stored on the device node.

3. The method of claim 1 in which the schedule comprises a randomly generated delay period.

4. The method of claim 1 in which the local control over the schedule is optimized using feedback information.

5. The method of claim 4 in which the feedback information comprises information from the server node regarding data sent to the server node.

6. The method of claim 4 in which the feedback information comprises information at a network layer level regarding packet transmissions.

7. The method of claim 4 in which the optimizations of the local control over the schedule includes a modification to a delay period.

8. The method of claim 4 in which the optimizations of the local control over the schedule includes a selection of a network path.

9. The method of claim 1 in which the server node broadcasts information about the media to other device nodes.

10. The method of claim 9 in which the information that is broadcast to the other device nodes comprises metadata about the media.

11. The method of claim 10 in which a selection by the other device nodes of the media causes raw data corresponding to the media to be sent to the other device nodes that made the selection.

12. The method of claim 1 in which metadata for the media is sent to the server node from the device node while locally storing raw data for the media at the device node.

13. The method of claim 1 in which the server node comprises a local server that acts on behalf of a central server node.

14. The method of claim 13 in which the local server routes data to the central server node, hold the data at the local server node, or broadcasts the data to other device nodes.

15. The method of claim 1 in which the server node is a central server node.

16. A multi-tier media system at an event location for an event, comprising:
   a device node which comprises a local storage for holding media captured at the device node;
   a server node, in which the server node is to receive the media from the device node, and where the device node is synchronized to a common clock with the server node and other device nodes; and
   wherein the device node at the event location is networked to the server node using a network connection that is locally controlled to schedule a transfer of the media, in real-time at the event, from the device node to the server node, where the common clock is used to locally control scheduling of the transfer of the media.

17. The system of claim 16 in which the media was captured and locally stored on the device node.

18. The system of claim 16 in which the schedule comprises a randomly generated delay period.

19. The system of claim 16 in which the local control over the schedule is optimized using feedback information.

20. The system of claim 19 in which the feedback information comprises information from the server node regarding data sent to the server node.

* * * * *